H. G. PHELPS.
8852X
Fuel Saving Cook and Baker.
Patented May 29, 1835.
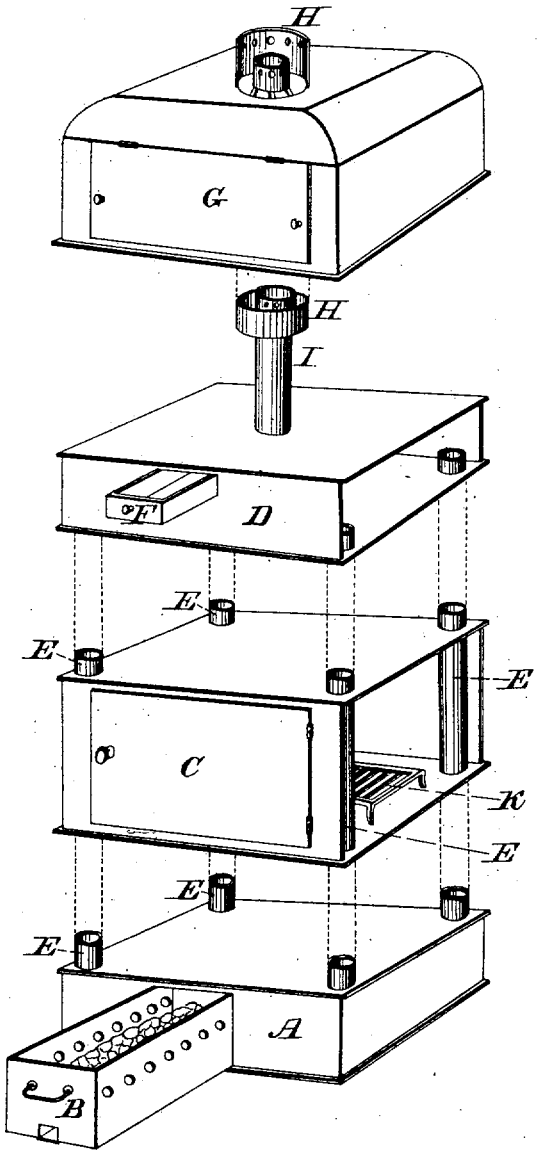
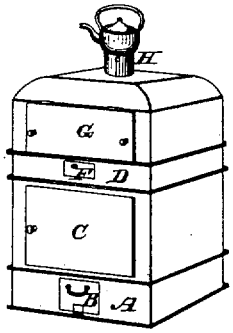

Hiram G. Phelps, of Johnson State of New York.

Letters Patent.

The schedule referred to in these Letters Patent and making part of the same containing a description in the words of the said Hiram G. Phelps, himself of his improvement in the cooking and baking stove called the fuel saving cook and baker, To all to whom to whom these presents shall come Hiram G. Phelps of Pleasant square in the town of Johnson, County of Montgomery and State of New York sends greeting.

Be it known that I the said Hiram G. Phelps have invented a new and useful and fuel saving cooking and baking stove, called the fuel saving cook and baker, not known or used before for cooking and baking which invention and the manner of using it are as follows.

First the basement story which is the 1st reservoir of heat is made of sheet iron, square or oblong and of such size as will be most convenient for the user, in this description say 18 by 22 inches, and 6 inches high with a drawer or grate, for coals, made of sheet iron, in the front end in the middle 5 inches wide 4 deep, and of nearly the length of the reservoir with holes through the bottom, under which and attached to it a trough the same length and breadth with the drawer, to receive the ashes, and open at the front ~~in the front~~ end to admit air.

Second, The main oven, the sides and door of sheet tin, or polished brass, for reflecting heat of the same length and breadth of the first reservoir, and 12 inches high, the top of said reservoir making the bottom of the main oven, with a large door, opening nearly the whole front end Third - The second reservoir of heat made of sheet iron like the first, but only of half its height, its bottom makes the top of the main oven. Near each corner of the top of the 1st reservoir, and bottom of the second, is a circular hole 2 inches in diameter into which is fitted the end of a tube or heat conductor of the same diameter, which four tubes conduct the heat from the first to the second reservoir, one through each corner of the main oven. In the middle of the front of the 2d reservoir is a small drawer to receive the ashes which may fall into it from the chimney, Fourth, The upper oven all of sheet tin or polished brass

8852X except the bottom which is the top of the 2d. reservoir, half the height of the main oven, the other dimensions the same with the main oven with the upper part of the sides & ends arching towards the middle, with a door 12 or 15 inches long at each end, being at the top of the oven & opening and shutting up and down. Fifth The chimney or furnace of sheet iron circular 7 inches in diameter inserted in the top of the upper oven, extending 6 inches above and 2 inches below the middle of the top of the upper oven, with air or smoke holes through the sides and a circular grate 5 inches in diameter, placed two inches from the bottom of the chimney on legs. A sheet iron three inch tube with one end inserted through the [illegible] of the top of the 2d. reservoir and the other end inserted through the botto[illegible] the chimney, conducts the heat from the second reservoir to the chimney or furnace, and boils the tea kettle set in the top of the chimney or furnace. One or two hands full of charcoal may be burned in the grate in the chimney, to boil the tea kettle, when the stove is not needed for cooking or baking; or when the heat from below is not sufficient for boiling it. two or three quarts of charcoal may be put in the drawer of the first reservoir, set on fire, and as soon as they are well burning the main oven will be sufficiently heated for baking bread, which may be put in tin pans or plates set on a grate made of iron rods with legs two inches high, standing on the bottom of the oven, Or the bread may be set in on bricks laid on the bottom of the oven.

The upper oven may be used at the same time for baking pies biscuit or cakes set on the bottom, and the tea kettle boiled set in the top of the chimney or furnace at the same time as above described. Also meat may be baked or fryed in the main oven, and most of all kinds of cooking and baking may be performed with the fuel saving cook and baker, that can be performed with any common cooking stove, and with a small share of expense for fuel, and if used with charcoal without being discommoded with smoke, or much heat in warm weather. It may also be used with anthracite coal, or fire wood when set in a fire place or out house, It may likewise be used for cooking & baking by being placed with a hole in the bottom of the 1st. reservoir made to fit the hole in the top of a common box or other stove, and sitting on it with the pipe covering the chimney of the cook and baker. Or it may be so used in an upper room with the pipe of a stove 8852X [illegible]

[illegible] entering the bottom of the first reservoir, with pipe on the furnace to carry off the smoke, with the necessary heat of the stove to warm the lower Room in cold weather, and no more. The fuel saving Cook and Baker may be made as above, omitting the upper oven and inserting the Chimney (made as above described) into the middle of the top of the second reservoir, and may in all respects be used as above described excepting the use of the upper oven.

In witness whereof, I have hereunto set, subscribed my name the 4th day of April 1835.

Hiram T. Phelps

Witnesses
Rodolphus W. McConnell
Allen Potter

1065 [illegible]

[illegible]

(Patents, 29 May 1835)

(Drawing.)